United States Patent [19]

Ryckman, Jr.

[11] 3,739,148

[45] June 12, 1973

[54] FOOD WARMING DISH

[75] Inventor: William D. Ryckman, Jr., Asheboro, N.C.

[73] Assignee: General Electric Company, Bridgeport, Conn.

[22] Filed: Jan. 28, 1972

[21] Appl. No.: 221,532

[52] U.S. Cl. ............... 219/441, 99/422, 219/501, 219/508, 219/521
[51] Int. Cl. ......................................... F27d 11/02
[58] Field of Search ................. 219/441, 465, 501, 219/508, 521; 99/422

[56] References Cited
UNITED STATES PATENTS

| | | | |
|---|---|---|---|
| 3,038,058 | 6/1962 | Gordon, Jr. | 219/508 |
| 3,588,447 | 6/1971 | Mills et al. | 219/501 |
| 3,231,718 | 1/1966 | Vasile | 219/465 |
| 3,462,585 | 8/1969 | Somers | 219/501 |
| 3,588,446 | 6/1971 | Mills et al. | 219/501 |

Primary Examiner—Volodymyr Y. Mayewsky
Attorney—Lawrence R. Kempton, Frederick P. Weidner and John F. Cullen

[57] ABSTRACT

A food warming dish that employs an electrical resistance heating element for heating a heat retentive material inside the dish. Energization of the heating element is regulated by a semiconductor control device having two terminals in electrical circuit with the heating element and a control gate that permits electrical current to flow between the two terminals only after a signal has been applied to the control gate. The semiconductor control device is arranged in an electrical circuit such that a temperature responsive switch in series relationship between the heating element and semiconductor control device prevents a signal from being sent to the control gate when the temperature reaches a set predetermind temperature.

6 Claims, 5 Drawing Figures

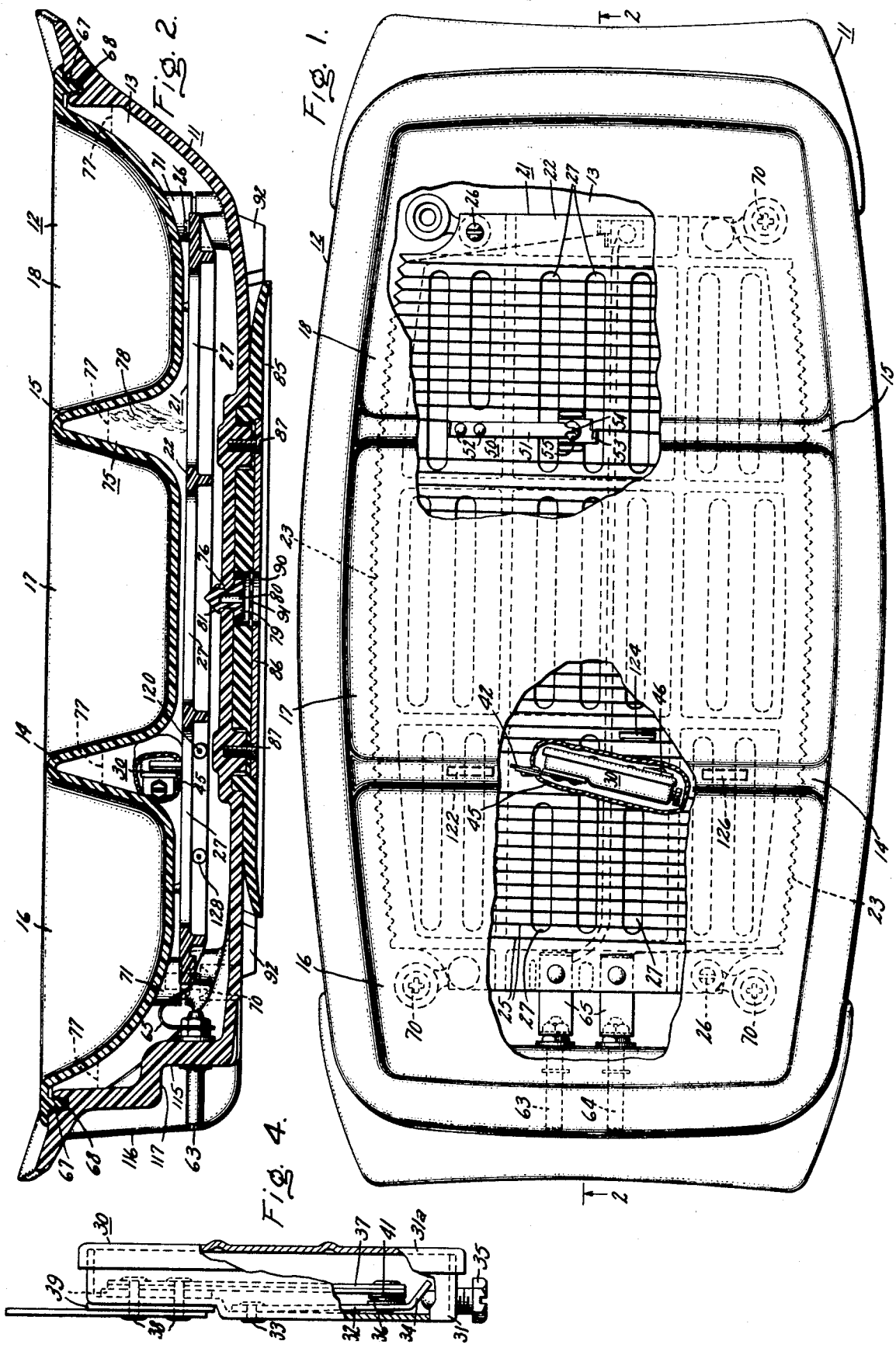

FOOD WARMING DISH

BACKGROUND OF THE INVENTION

1. Field of the Invention

This invention relates to food warming dishes, and particularly relates to an electrically heated food warming dish that may be used with a 200 – 250 volt power source.

2. Description of the Prior Art

A previously known type of food warming dish includes a reservoir for containing hot water, and the hot water imparts heat to the food contained in the dish. This type of heated dish, though widely used, is inconvenient and undesirable in many respects. For example, it is an inconvenience to fill the reservoir with hot water each time the dish is used, and if food already is in the dish there is a possibility of the water spilling or splashing onto the food. Also, the amount of warming of the food is apt to be inconsistent, since it depends upon variable factors, such as the amount of food in the dish, the temperature of the hot water placed in the reservoir, and the initial temperature of the food, e.g., sometimes the food will be initially at room temperature and at other times it will be at refrigerator temperature. These variable factors also cause an undesirable inconsistency in the length of time during which the food is maintained at a palatable temperature, and sometimes it is necessary to pour the cooled water out of the reservoir and refill with hot water. It will readily be appreciated that it is quite a feat to pour out the water and at the same time retain the food in the dish. In addition to these drawbacks of a water-heated food dish, there is a possibility that the water reservoir can become contaminated or un-sanitary because it cannot readily be cleaned.

Electrically heated food warming dishes that overcome the above-mentioned drawbacks of water-heated food dishes have been on the market for some time. Such electrically heated food warming dishes have only been suitable for use with a 120 volt power source because to convert such dishes so that they can be used with higher voltage electrical power sources, such as 200 – 250 volt power sources found in many areas of the world, presents several difficulties. For instance, the electrical resistance wire utilized to heat the dish must be four times the resistance of the wire used with a 120 volt power source. Normally this means that more turns of finer wire are needed which makes manufacture of an electrically heated warming dish for use with a 240 volt power source more difficult and more expensive. Moreover, because the wire is finer it inherently has a shorter life.

In addition, electrically heated food warming dishes have a thermostat that controls the temperature of the dish. These thermostats have contacts that open and close to energize and de-energize the resistance wire responsive to a temperature actuator. Used with a 200 – 250 volt power source these contacts would arc excessively as compared to use with a 120 volt power source and they would deteriorate very rapidly and soon become inoperative.

By my invention, there is provided an improved food warming dish that is heated by an electrical resistance heating element and is particularly suitable for use with a 200 – 250 volt power source and overcomes the above-mentioned difficulties.

SUMMARY OF THE INVENTION

The food warming dish in accordance with the present invention comprises a dish having a heat-storing material contained internally thereof. An electrical resistance heating element is in heat transfer relationship with the heat-storing material and is connected across an alternating current power source. A semiconductor control device having two terminals in electrical circuit with the heating element and also having a control gate is utilized to regulate power supplied to the heating element. The semiconductor control device permits current flow between the terminals only after a signal has been applied to the control gate of the device. Provided also is a control current source and a means for applying a signal to the control gate of the semiconductor control device which means includes a temperature responsive switch in series relationship located between the control current source and the control gate that prevents a signal from being sent to the semiconductor control device when the temperature reaches a set predetermined elevated temperature.

It is an object of this invention to provide an improved electrically heated food warming dish.

It is another object of this invention to provide an electrically heated food warming dish that may be used with a 200 – 250 volt electrical power source.

It is a further object of this invention to provide a food warming dish heated by an electrical resistance heating element in which a semiconductor device is utilized to regulate the energization of the heating element.

BRIEF DESCRIPTION OF THE DRAWINGS

FIG. 1 is a top view of a preferred embodiment of the invention, with portions thereof shown broken away so as to show the internal construction thereof;

FIG. 2 is a cross-section view taken on the line 2—2 of FIG. 1;

FIG. 4 is a broken-away view of a thermostat used in the invention, and

DESCRIPTION OF THE PREFERRED EMBODIMENT

Figure 5:
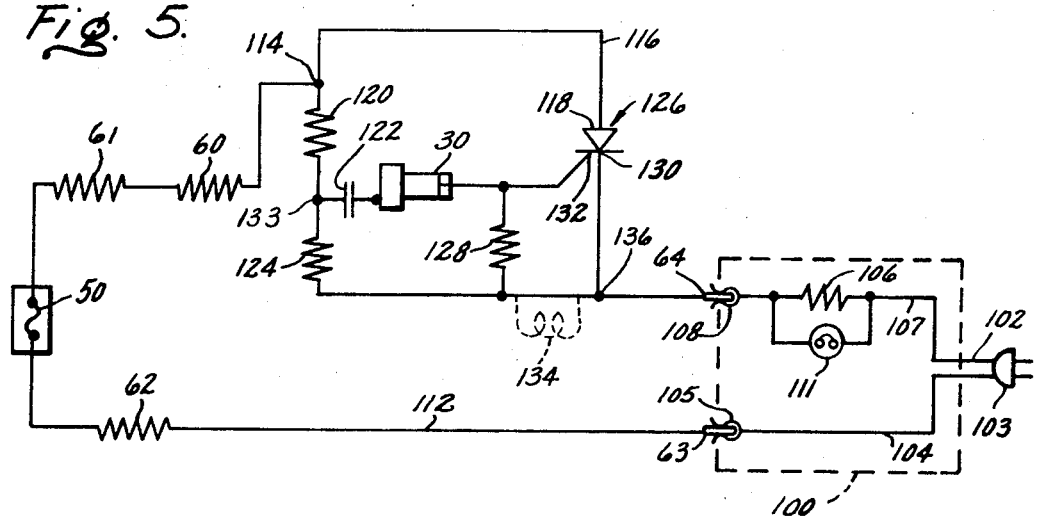
FIG. 5 is a schematic diagram of the electrical circuit of the invention.

The preferred embodiment of the food warming dish in accordance with the invention, comprises a dish-shaped base member 11, preferably somewhat rectangular in overall shape as shown in the drawing. A compartmented tray 12 is positioned within the base 11 and is shaped to provide a space 13 between the base 11 and the tray 12 internally of the food warming dish. The tray 12 is provided with one or more partitions 14, 15 for providing two or more compartments 16, 17, 18 for containing food. Preferably the base 11 and the tray 12 are made of a suitable plastic material, such as melamine formaldehyde.

In the internal space 13 there is provided a heater assembly 21, comprising a heater board 22 having a size and shape so as to substantially fill the space 13. The heater board 22 preferably is made from a plastic material, such as phenol formaldehyde, and opposite sides thereof are provided with a series of notches 23. An electrical resistance heating element 25 in the form of a wire is wound around the heater board 22 and is seated in the notches 23 at the edges of the board. When used with a 200 - 250 volt power source the heater wire may be about 11 mils in diameter and made from a suitable high resistance alloy to give a total resistance of approximately 180 ohms. A prior art warming dish with a conventional thermostat control 120 volt power would have wire of 10 mils diameter and be made of a lower resistance alloy that gives a total resistance of about 88 ohms. Therefore, the number of turns of wire around the heater board 22 are about the same for both type warming dishes with the total length of wire being approximately thirty feet. The heater board 22 is fastened to the base member 11 by means of screws 26. A plurality of openings 27 in the heater board 22 functions to permit circulation of a heat rententive material as will be described later on.

A thermostat 30 is attached to the heater board 22, preferably at a position where space is provided by a partition 14, as shown in the drawing. The thermostat 30 is connected electrically with the heater wire 25 as will be discussed later with respect to FIG. 5, and consists of an encased unit containing a bimetal strip which functions as a heat-sensitive switch, in a well-known manner. Preferably the thermostat 30 is set to break open the electrical circuit when it reaches a set predetermined elevated temperature of, for example, 120°F. Details of the thermostat 30 are shown in FIG. 4. A metal case 31 and cover 31A enclose a strip of metal 32 attached at an end thereof to the case 31 by means of a rivet 33 and having an angularly off-set portion 34 at the other end thereof against which is wedged the end of an adjustment screw 35 which is threaded through the metal casing 31. The strip 32 contains a contact 36, and adjustment of the screw 35 against the angularly off-set portion 34 of the strip 32 causes the contact 36 to be adjusted upwardly or downwardly, for adjusting the temperature at which the switch operates, as will be readily apparent. A bimetal strip 37 is attached to the case 31 by means of rivets 38, and is insulated from the case 31 by means of fiber insulator strips 39. A contact 41 at the end of the bimetal strip 37 normally engages the contact 36, thereby providing an electrical circuit between the case 31 and a connector lug 42 connected to the bimetal strip 37 by means of the rivets 38. By proper selection and dimensioning of the bimetal strip 37, and by proper adjustment of the adjusting screw 35, the bimetal strip 37 will cause the contacts 36, 41 to open and break the electrical circuit when the temperature of the thermostat reaches a desired elevated temperature, such as about 120°F. The thermostat 30 may be embedded within an epoxy compound or similar compound, if desired, as indicated at 45 in FIGS. 1 and 2. The thermostat 30 is connected in the electrical circuit by means of the lug 42 and a lug 46 attached to the cover 31A.

A thermal fuse 50 is connected in series with the heater wire 25, and preferably comprises a strip-like spring 51 of resilient metal attached at one end thereof to the heater board 22 by means of rivets 52, the other end thereof being soldered to a terminal strip 53 by means of a suitable solder material that melts at a temperature of about 200°F. Preferably, the soldered end of the fuse strip contains a tongue 54 which extends laterally from the strip 51 and into an opening in the terminal strip 53, the solder 55 being arranged to hold the tongue 54 in the opening of the terminal strip 53. The spring strip 51 is prestressed so as to pull the tongue 54 out of contact with the terminal strip 53, if the solder 55 melts. The thermal fuse 50 is connected electrically in series with the heater wire 25, the wire 25 being attached thereto at the terminal strip 53 and at the end of the strip 51 near the rivets 52.

Positioned close to the thermostat 30 in the space provided by the partition 14 is a semiconductor device 126 that is used to control energization of the heating element 25. The device 126 is a silicon controlled rectifier (referred to herein at times as "SCR") designated General Electric Company C106D1 which has a rating of 400 volts, 4 amperes. Located also in the space provided by the partition 14 and on the other side of the thermostat 30 from the semiconductor device 126 is a capacitor 122 having a rating of 0.047 microfarad. A 100K resistor 124 is also located near the thermostat 30. As seen in FIG. 2, a 1K resistor 128 and a 150K resistor 120 are positioned underneath the heater board 27 in close proximity to the thermostat 30. The circuit arrangement with these components and their function will be described later in connection with FIG. 5.

After the heater board assembly 21 is in place and is connected electrically, the tray 12 is sealed in place to the base 11. This is accomplished by providing the tray 12 with a downwardly extending continuous annular ridge 67 which engages a mating groove 68 in the base 11, and the ridge 67 is secured into the groove 68 by means of a suitable adhesive. The tray 12 is mechanically attached to the base 11 by means of four screws 70 extending upwardly through suitable openings in the bottom of the base 11 and into threaded bosses 71 extending downwardly from the bottom of the tray 12. The completed assembly of the base 11 and tray 12 provides a housing that is impervious to moisture.

The space 13 between the base 11 and the tray 12 is substantially filled with a flow-type of heat retentive material 75, which is poured into place through a small opening 76 in the bottom of the base member 11, the food warming dish being inverted for this filling process, whereafter the opening 76 is plugged as will be described. Suitable heat retentive materials are, for example, wax, paraffin, oil, and sand. The main requisites for the heat retentive material 75 are that it should have suitable heat retentive characteristics, and that it should be a flowing nature so that it can be poured through the opening 76 and so that it will assume a direct thermal engagement with the heater wire 25. Paraffin has adequate "flow" characteristics, because it is molten when poured into place and when at the operating temperature of the food warming dish. Oil, such as mineral oil, or other types of oil, obviously have the required "flow" characteristics. Likewise, sand or other granular material has a suitable "flow" characteristic. A sufficient amount of heat retentive material is provided in the space 13, so that its upper level will be approximately as indicated by the dotted line 77 in FIG. 2.

The fill opening 76 is sealed by a rubber plug 79 which preferably has an opening 80 extending partially therethrough, and an enlarged forward end 81 so that the plug 79 can readily be inserted through the opening 76 and will thereafter remain in position. The material of which the plug 79 is made, and the dimension of the hole 80, are such that if undue pressure should build up within the hollow space 13, the plug 79 will be forceably ejected, thereby relieving the pressure.

A rubber suction cup 85, preferably generally rectangular or oval in shape, may be, if desired, attached to the bottom of the base 11 by means of a metal plate 86 and screws 87. The metal plate 86 is provided with an opening 90 in alignment with the safety plug 79, and the portion 91 of the rubber suction cup in this region is sufficiently thin so that it can be ruptured readily by the plug 79 in the event of a safety plug blow-out. The suction cup 85 functions in the well-known manner to hold the food warming dish to a table top. It can readily be removed if not wanted, in which case the dish is supported by four legs 92 which extend from the bottom thereof.

Figure 3:
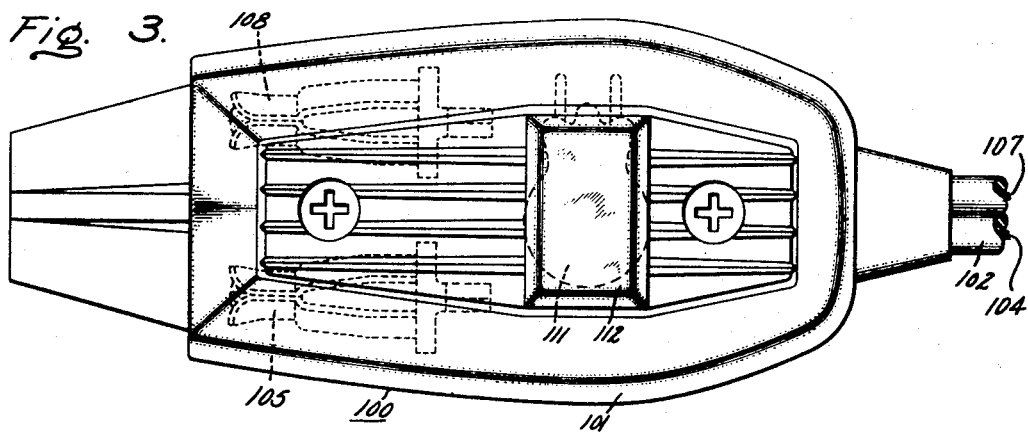
FIG. 3 is a top view of a connector assembly used in carrying out the invention.

With reference to FIG. 3, a connector assembly 100 is provided for the purpose of making a detachable electrical connection to the terminal pins 63 and 64. As shown in FIGS. 1 and 2, these terminal pins 63 and 64 are mutually parallel and are sealed through the wall of the base 11 in a moisture-tight manner by means of washers and nuts. The connector assembly 100 comprises a housing 101, made of a suitable material, preferably a plastic such as melamine formaldehyde. A power cord 102 extends from the case 101, and terminates at a conventional power plug (not shown). Internally of the casing 101, one of the power wires 104 is connected to a connector 105 which is adapted to engage the terminal pin 63. A small resistor 106 is connected between the other power wire 107 and a connector 108 which is adapted to engage the terminal pin 64. A pilot lamp 111 is connected electrically in parallel with the resistor 106, and is positioned so that light therefrom will be visible through a transparent or translucent jewel 112 positioned on or within the wall of the casing 101. It has been found that with the resistor 106 having a value of approximately 1 ohm, the lamp 111 should be of a type that will light sufficiently at a voltage of 1½ volts.

For a detailed discussion of the electrical circuit of the food warming dish, reference may be had to FIG. 5 of the drawings, where the electrical circuit diagram of the preferred embodiment is schematically illustrated. It should be understood that this electrical circuit is particularly useful when the food warming dish is used with a.c. power sources in the range of 200 to 250 volts. Many countries of the world use this voltage as their household current with the usual voltage normally being 230 – 240 volts. With power plug 103 inserted into a proper wall outlet for providing a.c. electric current and the connector assembly 100 contacting terminal pins 63 and 64, current flows in one side of the line 112 to a portion 62 of the heater wire 25 then through thermal fuse 50 to a second portion 61 and a third portion 60 of the heater wire to junction 114. From junction 114 the current divides with a large majority going to the semiconductor control device 126 via line 116. For the semiconductor control device 126 I have used a silicon controlled rectifier (SCR) having an anode terminal 118, a cathode terminal 130 and a control gate 132. This device is characterized by its high impedance to current flow in both directions unless a signal is applied to the control gate. The semiconductor control device permits electrical current to flow only during the remaining portion of each positive half cycle after a signal has been applied to the control gate to turn the device "on." The control current source may be obtained from any point in the circuit where polarity and voltage are capable of turning the semiconductor control device "on." After a signal has been applied to the control gate, the device will present a low impedance path for current flow between the anode terminal 118 and the cathode terminal 130 only as long as the voltage on the anode terminal is positive with respect to the voltage on the cathode terminal. The device does not permit current flow in a direction between the cathode terminal 130 and the anode terminal 118.

Means used to supply the signal to the control gate 132 includes a 150K resistor 120, a 100K resistor 124, a 0.047 microfarad capacitor 122 and thermostat 30. Operation of the signal portion of the electrical circuit is as follows. At the instant the line voltage is zero and terminal pin 63 is becoming negative with respect to terminal pin 64, the SCR 126 is in an open circuit or "off" condition. If the thermostat 30 is open the only path for current flow is through resistors 124 and 120 and heating element portions 60, 61, and 62. Because the combined resistance of 124 and 120 is about 250,000 ohms while the resistance of heating element portions 60, 61, and 62 is only about 180 ohms, essentially all of the voltage will be across the resistors 124 and 120. As terminal pin 63 becomes more negative with respect to terminal pin 64 resistors 120 and 124 function as a voltage divider so that approximately forty percent (40 percent) of the voltage will appear at junction 133 and make it negative with respect to terminal pin 64 and the cathode terminal 130 of the SCR 126.

If thermostat 30 is closed, capacitor 122 will be caused to become charged with the side connected to the thermostat becoming positive with respect to junction 133. The time constant for the capacitor charging circuit is approximately 3 milliseconds while the time for the source voltage to go from 0 to maximum is 4 to 5 milliseconds so the charge on the capacitor will lag behind the line voltage. Thus, peak negative voltage at junction 133 will occur after the peak negative voltage at terminal pin 63. Similarly, the capacitor will still have voltage on it when the line voltage returns to zero. This voltage will be positive on the thermostat side of the capacitor with respect to junction 133. When terminal pin 63 begins to go positive with respect to terminal pin 64, junction 133 will begin to go positive with respect to terminal pin 64 and the cathode terminal 130 of SCR 126. The end of the capacitor connected to the control gate 132 through thermostat 30 is more positive than junction 133, which causes the SCR to turn on very early in the positive half cycle. This is desirable to minimize radio interference from harmonics resulting from the sharp current rise at turn on. Thus, when the thermostat is closed, full current will flow through the heating element 25 for essentially the entire positive half cycle of every cycle of the power source and when the thermostat is open, no gate current will flow, the SCR will remain off, and only negligibly small current will flow through the heating element due to the high resistance of resistors 120 and 124.

During the portion of a cycle that the SCR is conducting, only a small voltage appears between junction 114 and the control gate 132 and cathode terminal 130 of the SCR. Thus, capacitor 122 will be essentially discharged at the beginning of the negative half cycle and is ready to be charged again as already described.

It should be noted that the control portion of the circuit between junction 114 and terminal pin 64 including resistors 120 and 124, capacitor 122, thermostat 30, resistor 128, and semiconductor control device 126, is in series with the heating element portions 60, 61, and 62, and the fuse 50. The said control portion and heating element portions 60, 61, and 62 and fuse 50 may be connected in series in any order without changing the operation of the circuit.

It should also be noted that an inductor 134 shown in dotted lines in FIG. 5 added in series with the line connecting the means for applying the signal to the control gate and the main current circuit from the cathode, may be used instead of the capacitor 122 to cause the SCR to turn on early in the positive half cycle. Either a capacitor as described or an inductor as described are referred to herein as a reactive element.

The food warming dish functions as follows. The connector assembly 100 is plugged onto the terminal pins 63, 64, and the power plug 103 is plugged into a power socket, either before or after food is placed in one or more of the compartments 16, 17 and 18. The heating element 25 will become warmed due to the current flowing therein, and will heat the heat retentive materials 75, which in turn will impart heat to the food in the compartments 16, 17 and 18. If the heat retentive material 75 is an oil, or a wax, or paraffin (which becomes fluid when heated by the heater wire 25), it will circulate through the openings 27 due to a natural convection process, so that the material 75, and hence the food in the compartments, will become heated more rapidly. The heater board 22 is sufficiently thick to cause the heating element 25 to be adequately spread out in the space 13 so as to heat the material 75 quickly and uniformly. A network 78 of heat-conducting material, in the form of metal particles, or wire or shredded foil, may be immersed throughout all or part of the heat retentive material 75, to facilitate rapid heat distribution. The material of the network 78 should be a better heat conductor than the heat retentive material 75, and should be electrically separated from the heater wire 25. If the network 78 is in contact with the heater wire 25 at a plurality of points, the heater wire preferably should have an electrically insulative coating or covering.

When the heat retentive material 75 reaches the proper temperature for bringing the food to a palatable warmth, the thermostat 30 will operate to open the electric circuit and stop the heating process. When the heat retentive material 75 cools slightly, the thermostat 30 will energize the electrical circuit, thereby causing the heating element 25 to bring the heat retentive material to the heated condition. Although the heat retentive material will fluctuate slightly in temperature due to the functioning of the thermostat 30, the range of operating temperature is suitable for maintaining the food at a palatable temperature. Since the thermostat 30 is located in the heat retentive material 75, rather than being in thermal contact with the heating element 25, its functioning will depend upon the temperature of the heat retentive material rather than upon the temperature of the heating element, thus providing accurate control of the temperature of the heat retentive material 75.

The lamp 111, being connected in a series circuit with respect to the heating element 25, will light whenever current is flowing in the heating element. Thus, when the food warming dish is first turned on, the lamp 111 will light. After a few minutes, the lamp 111 will go off, indicating that the thermostat 30 has opened the circuit due to the temperature having reached a proper value. When the lamp 111 goes out, the connector assembly 100 may be removed from the engagement with the terminal pins 63, 64 and the dish may be placed in front of the infant for feeding. The heat retentive material 75 has sufficient heat mass to maintain the food at a satisfying temperature for approximately one-half hour, which is adequate for a normal feeding. If the feeding should be interrupted, the dish can be again plugged into the connector assembly 100 in order to maintain the food warm. A material 75 such as paraffin, which changes from a liquid state to a solid state while the dish is being used, gives up its latent heat of fusion and thus prolongs the period of warmth.

For absolute safety, in the event that the thermostat 30 should fail to operate and open the electrical circuit when the proper temperature has been reached, the thermal fuse 50 will function when the temperature of the heat retentive material 75 reaches a higher value, for example, about 200°F., and will open the electrical circuit thereby turning off the heating power. If this should happen, the food warming dish is no longer serviceable, due to the defective thermostat and the open thermal fuse. If excessive internal pressure should build up due to excessive heat, the plug 79 will function to relieve the pressure.

It will be appreciated that I have provided a practical, serviceable, and convenient food warming dish which is automatic in operation and thoroughly safe for use with an infant. Being a completely sealed unit, it can be immersed in water for washing, and can be washed in a dishwasher machine. The food warming dish is automatically brought to and maintained at adequate temperature, and is electrically safe because no power is connected to it while in use for feeding an infant. Furthermore, while power is being applied to the food warming dish, it is safe because of the thermostat 30, the thermal fuse 50, and the safety plug 79. Moreover, because of the electrical circuit and semiconductor control device employed the food warming dish may be used with a 200 – 250 volt power source. It is these features, which provide automatic operation and absolute safety, that render my food warming dish practical.

While a preferred embodiment of my invention has been shown and described, various other embodiments and modifications thereof will occur to those skilled in the art, but such other embodiments and modifications will fall within the scope of my invention as defined in the following claims.

We claim:

1. An electrically heated apparatus comprising:
  a. a hollow food receiving dish structure containing a heat retentive material therein,
  b. a pair of terminals,
  c. an electrical resistance heating element being disposed within the heat retentive material,
  d. a semiconductor control device connected in series with said heating element across said terminals for controlling the flow of electric current therethrough, said control device having a control gate for receiving control signals for turning-on said control device,
  e. a resistive circuit connected in series with said heating element across said terminals, the resistance of said resistive circuit being sufficiently greater than the resistance of said heating elements to substantially prevent the flow of current through said heating element when said control device is not conducting and normal operating voltage is applied to said terminals, and d. control signal transmission means interconnecting said control gate and said resistive circuit at a point at which the maximum voltage is substantially less than the maximum voltage applied across said terminals, said control signal transmission means including a temperature responsive switch responsive to a set predetermined elevated temperature to move normally closed contacts to an open position to prevent the transmission of a control signal to said control gate.

2. An electrically heated apparatus as defined by claim 1 in which said control signal transmission means further includes reactive means responsive to an alternating voltage applied across said terminals to generate control signals of sufficient magnitude to turn-on said control device at an earlier point in the voltage wave form than would otherwise be possible.

3. An electrically heated apparatus as defined by claim 2 in which said reactive element is a capacitor in series with said temperature responsive switch.

4. An electrically heated apparatus as defined by claim 3 wherein said switch includes a bimetal blade that bends in response to the set predetermined elevated temperature to move the contacts to their open position.

5. An electrically heated apparatus as defined by claim 3 further comprising a thermal fuse connected in series relationship with the heating element to open the circuit of the heating element in the event that the temperature of the heat retentive material reaches a temperature higher than the set predetermined elevated temperature of the temperature responsive switch.

6. An electrically heated apparatus as defined by claim 3 wherein a power connector is adapted for removable engagement with said terminals to supply electrical power to the heating element from a power source.

* * * * *